Oct. 21, 1941. W. L. ATWOOD ET AL 2,260,131
AUTOMATIC CONTROL SYSTEM
Filed May 19, 1938 2 Sheets-Sheet 1

INVENTORS
WILFRID L. ATWOOD,
LUCIAN N. JONES AND
HORACE L. SMITH, JR.
BY
ATTORNEY.

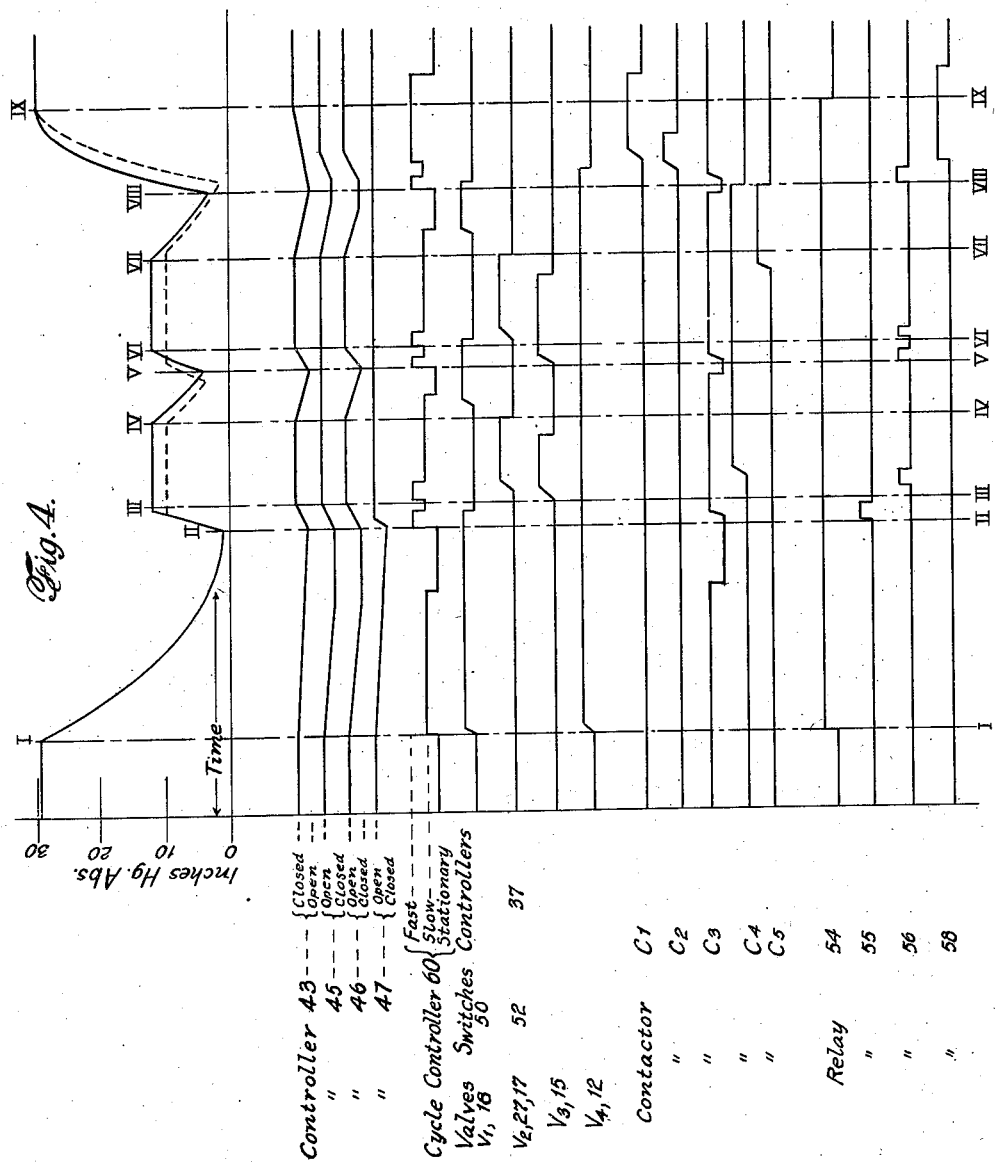

Patented Oct. 21, 1941

2,260,131

UNITED STATES PATENT OFFICE 2,260,131

AUTOMATIC CONTROL SYSTEM

Wilfrid L. Atwood, Lucian N. Jones, and Horace L. Smith, Jr., Richmond, Va., assignors to The Bristol Company, Waterbury, Conn., a corporation of Connecticut Application May 19, 1938, Serial No. 208,946

7 Claims. (Cl. 137—78)

This invention relates to automatic control systems, and more especially to an automatic control system for discontinuous processes wherein are coordinated changes of pressure or similar variables and intervals of time.

The cycle of conditions in one typical treating process, with which the present control system may be employed, may involve first, an evacuation in which the absolute pressure is carried down to a low ultimate value, say one-tenth inch of mercury; second, the introduction of steam with a rapid increase in pressure to an absolute value of, say, twelve inches of mercury where the pressure is held for an interval of several minutes; third, an evacuation to an absolute pressure of, say, four inches; fourth, a second introduction of steam with an increase in absolute pressure to, say, twelve inches at which point it is once more held for a predetermined period; and fifth, another evacuation to an absolute pressure of, say, three inches of mercury. Such process may be terminated by placing the treatment chamber in communication with the atmosphere and allowing the pressure therein to rise to atmospheric value, when the material under treatment may be removed.

Such treatment, being essentially discontinuous and involving wide variations of pressure and a number of discrete critical values which such pressures must attain and hold for more or less extended periods, would ordinarily require the most careful supervision by expert operatives, together with a considerable amount of labor in the manipulation of valves as pressures or temperatures attain the required values, and as predetermined time intervals are accomplished.

It is an object of this invention to provide a control system in which is effected a complete and automatic coordination of variables such as those hereinbefore described at different predetermined values, with time intervals of various predetermined durations, to make up a prearranged process cycle of operation.

A further object of the invention lies in the provision of means whereby there may be alternatively carried out two cycles of operation, similar in their general nature but differing in the limiting values of involved variables.

In the invention herein set forth and described, there is provided a system involving coordination of measuring, controlling, and timing units, whereby there is effected a control of the desired type with exactitude and precision, and with a complete elimination of the personal element. This is accomplished by providing governing means for valves for admitting fluid to, and exhausting fluid from, a closed chamber, such governing means including timing mechanism driven by electric motor means and subject to operation at either of two speeds. The governing means embody suitable cam means for governing the operation of said valves and for affecting the operation of said motor means; and means subject to pressure changes in said chamber to initiate the operation of said timing mechanism at one of said speeds upon attainment of certain predetermined pressure values in said chamber, while other pressure-sensitive means initiate operation of said timing mechanism at the other of said speeds on the attainment of other predetermined pressure values in said chamber. In addition, means are provided which are subject to said operation-affecting means for interrupting the power supply to said electric motor means.

The nature of the invention, however, will best be understood when described in connection with the accompanying drawings, in which:

Fig. 4 is a graphic representation of the variables characterising a typical cycle of operation, together with a diagram of operation of the several controllers, valves, switches, and relays embodied in the system.

Figures 1, 2, 3:
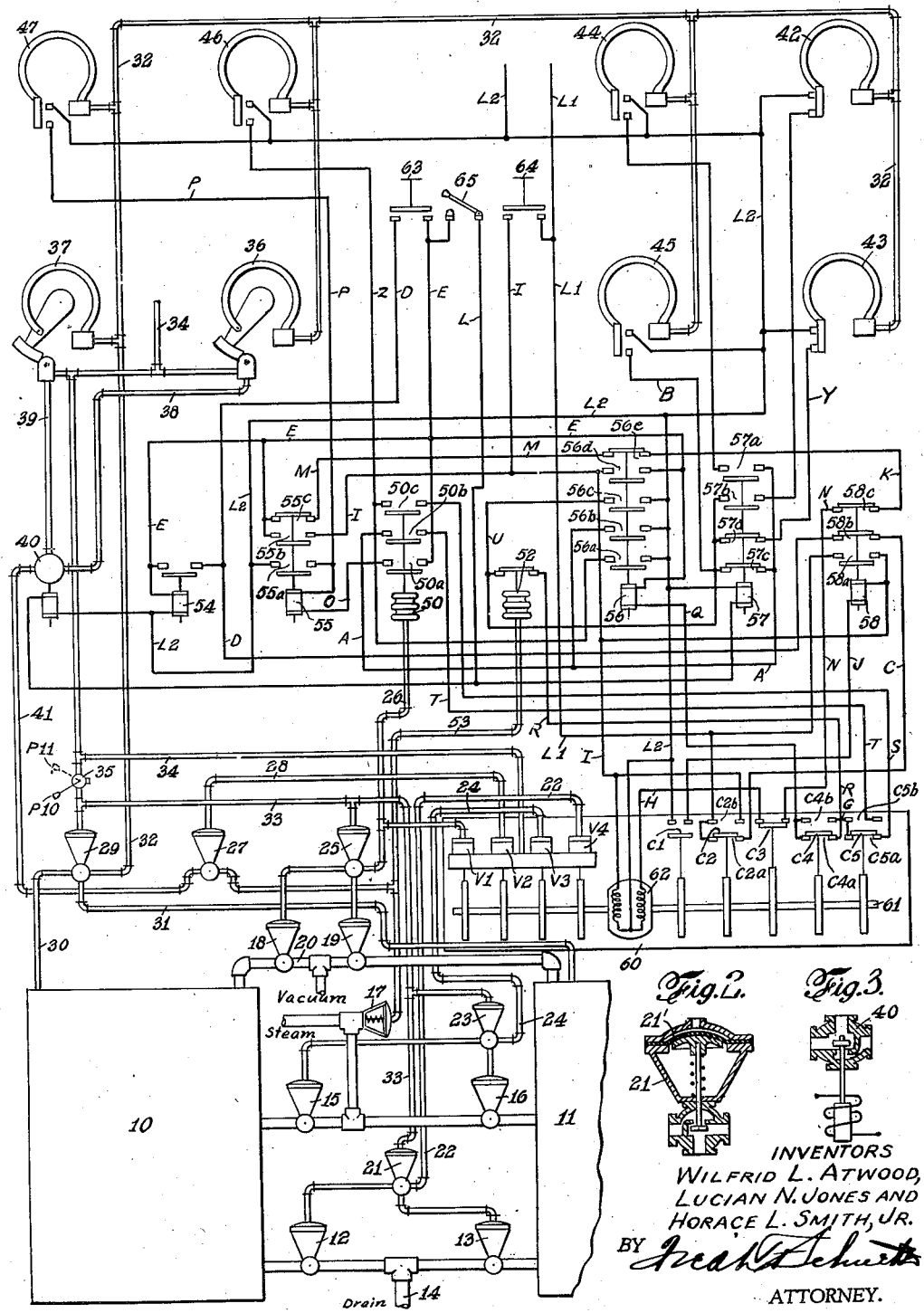
Fig. 1 is a diagrammatic representation of a control system embodying the principles of the invention.
Figs. 2 and 3 illustrate, partly in section, certain valves used in the control system.

Referring to the drawings, 10 and 11 designate similar processing containers or chambers adapted to contain, for example, batches of material to be treated, and being adapted for sealing off from the atmosphere, and having connections whereby their interior spaces may be placed in communication with a source of vacuum, a source of steam, or with a drain at atmospheric pressure. Two pneumatically actuated valves 12 and 13 of the direct-acting type (in which a pressure of air upon the control diaphragm effects a closing of the valve) provide connection between the chambers 10 and 11, respectively, and a drain pipe 14.

Two pneumatically actuated valves 15 and 16 of the reverse-acting type (in which a pressure of air upon the control diaphragm effects opening of the valve) similarly provide communication between the respective chambers and a source of steam (not shown) as controlled by a regulating valve 17. Two pneumatically actuated valves 18 and 19 of the reverse-acting type similarly provide communication through pipe 20 between the respective processing vessels and a source of vacuum (not shown).

In the pneumatic control lines to the valves 12 and 13 is inserted a three-way valve 21, having an internal arrangement as shown in Fig. 2, whereby upon application of air pressure to its diaphragm 21', control fluid under pressure from a conduit 22 will be operatively applied to the diaphragm of valve 12, and upon release of control pressure upon the diaphragm 21' of valve 21 control pressure from conduit 22 will be operatively applied to the diaphragm of valve 13.

In the pneumatic control lines to valves 15 and 16 is inserted a three-way valve 23 similar to the valve shown in Fig. 2, and so connected that with air under pressure applied to its diaphragm, control fluid under pressure from a conduit 24 will be operatively applied to the diaphragm of valve 15, and upon release of pressure upon the diaphragm of valve 23 control fluid under pressure from conduit 24 will be applied to valve 16. Similarly, a three-way valve 25 of the same type included in the lines to valves 18 and 19 is so connected that with air under pressure applied to its diaphragm, control fluid under pressure from a conduit 26 will be operatively applied to valve 18, and upon release of air pressure on its diaphragm said control fluid under pressure will be operatively applied to valve 19.

A reverse-acting valve 27 subject to operation by air from a conduit 28 serves to permit or interrupt (according to presence or absence respectively of air pressure in said conduit) the flow of air, at a pressure variably controlled by means hereinafter to be set forth, to the diaphragm top of regulating valve 17 in a sense to reduce the opening of said regulating valve upon an increase of said controlled pressure, and upon release of said pressure to allow valve 17 to open fully, placing the valves 15 and 16 in free communication with the source of steam pressure.

A three-way diaphragm-operated valve 29, of the type shown in Fig. 2, is connected to the two vessels 10 and 11 by conduits 30 and 31 in such a manner that upon application of control fluid under pressure to the diaphragm of the valve 29, the interior of the chamber 10 will be placed in communication with the conduit 32, and upon release of said control fluid under pressure, the interior of chamber 11 will be placed in communication with conduit 32, only one of these chambers at a time being so connected and the other closed off.

The diaphragm tops of valves 21, 23, 25, and 29 are connected to a common conduit 33, which receives a supply of air from a source 34 under constant pressure through a manually-actuated three-way cock 35, having two positions, designated "P—10" and "P—11", such that when the cock is in position "P—10" as shown in the drawings, air from source 34 will be admitted to conduit 33, applying pressure upon the diaphragms of the four valves supplied thereby; and with the cock in the position "P—11", pressure will be released and the diaphragms of the valves vented to the atmosphere. This arrangement constitutes a valve means commonly known as of supply and waste type.

With the body connections of the four valves 21, 23, 25, and 29 as above set forth, it will be seen that with the three-way cock 35 in position "P—10" the valves 12, 15, and 18, governing communication of the interior of the chamber 10 with the drain, the regulated steam supply, and the vacuum respectively, will have their operating diaphragms placed in communication with conduits 22, 24, and 26, respectively, and that the interior of chamber 10 will be placed in communication with conduit 32 and that of chamber 11 cut off therefrom.

With this arrangement of valves, the chamber 10 will be subjected to the process cycle control as hereinafter set forth, while at the same time the absence of pressure in the diaphragm chambers of reverse-acting valves 19 and 16 will permit these valves to close, cutting off communication of the chamber 11 with the vacuum or the steam supply, while the direct-acting valve 13 will stand open maintaining communication between the interior of the chamber 11 and the drain or atmosphere. Under this condition, the chamber 11 may be opened for unloading and charging while the process is being effected in chamber 10. Similarly, it will be seen that with the three-way cock 35 in the position "P—11," the chamber 11 will be connected into the system for carrying out the process cycle, while the chamber 10 is disconnected and may be opened for unloading or charging.

The conduit 32 serves to place in communication with the fluid under pressure existing in the interior of chamber 10 or 11 (according to the position of three-way cock 35) a number of pressure-sensitive devices, the nature of which will now be set forth. Since the process to whose control this system is particularly adapted requires at different stages in the cycle a number of different pressure values within the processing chambers, and since provision is definitely made for different cycles involving different pressure groups, there are shown a number of discrete pressure-sensitive elements, each calibrated to produce a definite response or effect at a definite pressure value.

A particular process which the disclosed embodiment of my system is adapted to control, will be understood by reference to Fig. 4 of the drawings in which a typical cycle of conditions embodying this process is graphically represented, and wherein the ordinates represent absolute pressure and the abscissae elapsed time. In accordance with the process disclosed by way of illustration, the material to be treated is placed in one or the other of the processing chambers which is then closed and sealed at atmospheric pressure, as indicated at I on the curve. A process of evacuation is then initiated, carrying the absolute pressure down to an ultimate value of $\frac{1}{10}$ inch of mercury, indicated at II on the curve. At this point steam is admitted, and the pressure rapidly raised to an absolute value of 12 inches, as at III, where it is held for a time interval of several minutes, to a point as indicated by IV on the curve. The steam is then shut off and the chamber again evacuated until an absolute pressure of 4 inches is attained, as at V, after which steam is again admitted and the pressure brought up to 12 inches, as at VI, where it is once more held for a predetermined period, reaching the point VII on the diagram. The steam is then shut off and the chamber evacuated to an absolute pressure of 3 inches, as at VIII, after which the chamber is placed in communication with the atmosphere and the pressure allowed to rise to atmospheric, as at IX, when the treatment is complete, and the material may be removed. An alternative cycle, similar in every respect, but characterized by different limiting values, is shown by the dotted lines in the diagram; and it is desirable that such a cycle should be available at any time without changes in procedure or equipment. It should be understood that the process herein described forms no part of the present invention which relates solely to control equipment for use in governing processes of this and other types.

For control of the pressures, two pneumatic control instruments 36 and 37 are provided, preferably of the type set forth in U. S. Letters Patent No. 1,880,247, granted to the applicant's assignee October 4, 1932, and are actuated by pressure in the conduit 32. These instruments serve thereby to control pneumatic pressure in conduits 38 and 39, respectively, which conduits are connected to the body of a three-way solenoid-operated valve 40 having an internal arrangement as shown in Fig. 3, whereby, according to energization or de-energization respectively of the solenoid, air pressure in a conduit 41, leading through the valve 27 to the regulating valve 17, is made subject to controller 36 or 37.

In accordance with the two alternative process cycles, the controllers 36 and 37 are calibrated to different pressure values (for example 10 inches and 12 inches of mercury absolute, respectively), so that, for instance, when the solenoid of valve 40 is energized, the controller 36, acting on valve 17 through the valve 27, will tend to maintain in whichever of the chambers 10 or 11 is at that time connected into the control system a steam pressure of 10 inches; and with the solenoid of valve 40 de-energized, the controller 37 will become effective and will tend similarly to maintain a pressure of 12 inches absolute.

Two pressure-actuated electrical controllers 42 and 43, both connected to the conduit 32, are calibrated to close contacts at pressures respectively of 10 and 12 inches of mercury or over, corresponding to the two process cycles. Similarly, two electrical controllers 44 and 45 are adjusted to maintain their electrical contacts open at pressures of 2 inches and 3 inches, respectively, within the conduit 32, closing their contacts as said pressures fall below said values. An electrical controller 46, having normally open contacts, closes the same at a pressure of 4 inches or lower in the conduit 32, and a similar controller 47 closes contacts at a pressure of 0.1 inch or lower in said conduit.

A pneumatically-actuated pressure-switch 50, supplied from the conduit 26, acts under the influence of pressure in said conduit to close three independent sets of electrical contacts, designated as 50—a, 50—b, and 50—c, coincident with the opening of valve 18 or 19 (according to the setting of three-way valve 25). A pneumatically-actuated pressure-switch 52, supplied through a conduit 53 which is connected to the diaphragm of regulating valve 17, serves to open a set of normally closed electrical contacts when said valve is receiving air pressure from the conduit 28 through valve 27, so that said contacts are closed only when the regulating valve is not subject to controlling pressure, and is consequently standing in its full open position.

Interaction of the electrical circuits is effected by means of the following five relays: Relay 54 carries a single set of normally open contacts, closed when the relay is energized. Relay 55 carries two sets of normally open contacts 55—a and 55—b, and one set of normally closed contacts 55—c. Relay 56 has four sets of normally open contacts 56—a, 56—b, 56—c, and 56—d, and one set of normally closed contacts 56—e. Relay 57 has two sets of normally open contacts 57—a and 57—b, and two sets of normally closed contacts 57—c and 57—d. Relay 58 has one set of normally open contacts 58—a and two sets of normally closed contacts 58—b and 58—c.

Time elements are introduced into the system by a time-cycle controller 60 having cams adapted to actuate pilot valves and electrical contactors as hereinafter set forth, said cams being mounted upon a common shaft 61 adapted to be driven by a motor element 62 of the type whereby the cam shaft may be driven in one direction at either of two velocities according to the energization of either of two respective windings, herein designated as "Fast" and "Slow." The fast operation of the timing instrument is particularly adapted for those parts of the cycle wherein one or more valves or contactors are to be operated as rapidly as possible, either simultaneously or in a predetermined sequence with little regard to intervening time intervals. The "slow" operation is used either where definite timing over considerable periods is required, or where the cycle involves a definite delay between two events, as, for example, the opening of a valve and a further operation following a consequent pressure change of somewhat indefinite, but relatively short, time. In the periods when the timing instrument remains at rest the cycle of operations is suspended until a variable (in this case pressure) reaches a definite value as predetermined by the setting of one of the control instruments. A preferred form of such driving system is set forth in U. S. Letters Patent No. 2,050,614, granted to applicant's assignee August 11, 1936. Four pilot valves, V1, V2, V3, and V4 (preferably of the type set forth in U. S. Letters Patent No. 1,890,494, granted to applicant's assignee December 13, 1932); and five quick-acting contactors C1, C2, C3, C4, and C5 (preferably of the type set forth in U. S. Letters Patent No. 1,960,020 issued May 22, 1934) are associated with the respective cams carried by the shaft 61.

The pilot valves V1, V2, V3, and V4 receive air from the source 34 and communicate respectively with conduits 26, 28, 24, and 22, in such a manner that, when any one of these valves is opened by its corresponding cam, air is admitted to its associated conduit; and when a valve is closed, the entrapped air is vented to the atmosphere. Contactors C1 and C3 are of the single-pole type, and may be opened or closed by the action of their respective associated cams. Contactor C2 has a normally closed contact C2—a and a normally open contact C2—b. Contactor C4 has a normally closed contact C4—a and a normally open contact C4—b. Contactor C5 has a normally closed contact C5—a and a normally open contact C5—b.

The relative timing of the several pilot valves and contactors is illustrated diagrammatically in Fig. 4, and will be discussed in greater detail under the heading of "Operation."

In addition to the automatically actuated electrical contacting units hereinabove set forth, the system includes two normally-open, instantaneous manually-operated push-button contactors 63 and 64, and a manually operated maintained-contact switch 65. Electrical power is supplied to the control system from a two-wire circuit, the respective conductors of which are designated as L1 and L2.

Line conductor L1 passes directly to the common point of contactor C2. The normally-closed contact C2—a is connected by a conductor C to contact 58—b, thence by a conductor D to the contact of relay 54, thence by a conductor E to contact 50—a of pressure-switch 50, and also to a common connection between contacts 55—b and 55—c, to contact 56—d, and to one terminal each of the operating solenoids of relays 54 and 56, the free terminal of the former being connected to line conductor L2. The normally-open contact C2—b of contactor C2 is connected to a conductor I, and thereby to the "fast" terminal of the motor 62, whose common terminal is connected to the line conductor L2. Conductor I is further connected to contacts 55—b and 56—d, these thus forming an alternative connection between conductors I and E. The contacts 50—a of pressure-switch 50 provide a connection between conductor E and conductor O, the latter of which is connected to one side of the operating solenoid of relay 55. The other side of this coil is connected to a conductor P, which may be placed in connection with line conductor L2 through either the contact of controller 47 or contact 55—a.

The "slow" terminal of motor 62 is connected to a conductor H which leads to contactor C—3 of the cycle controller, thence by a conductor N to contacts 58—c, thence by a conductor K to contacts 56—e, and thence by a conductor M to contact 55—c and thus to conductor E. To the common point of contactor C—4 is connected a conductor Q, which leads to one terminal of the operating coil of relay 56, the other terminal of which is connected to the conductor E.

The normally-closed contact C4—a of contactor C4 is connected by means of a conductor R to one side of the contact of pressure-switch 52, and thence by a conductor U to one side of contact 56—c, the other side of which is connected to line conductor L2. Conductor U leads also to a common terminal between contacts 57—b and 57—d. Normally-open contact C4—b is connected by a conductor G to the common terminal of contactor C5. Normally-closed contact C5—a is connected by a conductor S in series with the contact 50—c of pressure-switch 50, and thence by conductor Z to contact 56—a and to controller 46, either of which provides an alternative path between Z and line wire L2. Normally-open contact C5—b is connected by conductors T and A in series with contact 50—b of pressure-switch 50 to a terminal common to contacts 57—a and 57—c.

Contactor C1 provides a connection between conductor L2 and conductor J, leading to one terminal of relay 58, the other terminal of which is connected to the conductor I.

Manually-operated push-button switch 63, providing momentary connection between conductors D and E, completes a circuit set forth hereinafter in greater detail, whereby, through energization of relay 54, the operating cycle is initiated. Manually-operated push-button switch 64, providing momentary connection between conductors L1 and I, serves to energize relay 58; and contact 58—a connected in parallel with switch 64 acts as a locking-in contact therefor. Switch 65 provides contact between conductors E and L, thus connecting E to the free ends of the operating solencids of relay 57 and valve 40, the other terminals of which are connected to line conductor L2, so that relay 57 and solenoid valve 40 remain energized so long as the switch 65 is closed.

*Operation*

Let it be assumed that the chamber 10 is charged with material to be processed and that it has been closed and sealed in the proper manner. Control pressure of air is applied to conduit 34, and a suitable electrical potential applied between the line conductors L1 and L2, the pipes 20 and 14 being in communication with vacuum and atmosphere, respectively, and the regulating valve 17 connected to a source of steam pressure.

Initially, all the relays 54, 55, 56, 57, and 58 will be de-energized, with their respective contacts in their normal closed and open conditions. The valve 35 will be placed in the position "P—10" corresponding to processing in the chamber 10, whereupon the valves 21, 23, 25, and 29 will assume positions placing that chamber in communication with the various processing members, while chamber 11 will be rendered inert. Controllers 42, 43, 44, 45, 46, and 47, all being adjusted to operate at absolute pressures below atmospheric, 42 and 43 will stand with their contacts closed, and the remaining four instruments with their contacts open. Pneumatic controllers 36 and 37 will stand in a position to maintain at a minimum the control pressures in associated conduits 38 and 39.

The cycle controller 60 will stand with all pilot valves closed and the electrical contactors in the positions shown. There being no air pressure in conduit 26, the pressure-switch 50 will stand with all its contacts open, and the valve 18 will be closed. There being no air pressure in conduit 28, the reverse-acting valve 27 will be closed, with the result that conduit 53 will have no pressure therein, so that the pressure-switch 52 will stand with its contacts closed, and regulating valve 17 will be open. There being no air pressure in conduit 24, the reverse-acting valve 15 will be closed; and there being no pressure in conduit 22, the direct-acting valve 12 will stand open. The solenoid of valve 40, being in parallel with the operating coil of relay 57, will be de-energized, so that conduit 41 will be in communication with the conduit 39 and the controller 37, which has been pre-set to regulate when in operation, to a pressure of 12 inches of mercury.

Assuming that it is desired to process material in chamber 10 according to the cycle involving the group of pressures having the higher values, as shown in the full-line graph of Fig. 4, the switch 65 is left in its open position, so that relay 57 remains de-energized, cutting out the electrical circuits of controllers 42 and 44. The solenoid valve then remains in the position hereinbefore referred to, rendering pneumatic controller 36 ineffective. This condition corresponds to point "I" on the diagrams in Fig. 4.

The process cycle is initiated by momentarily depressing the push-button contact 63, joining conductors D and E, and completing a circuit which permits current to pass from line wire L1, through contact C2—a, conductor C, contact 58—b, conductors D and E to the winding of relay 54, and thence to line wire L2, energizing said relay, closing its contacts, and thus bridging momentary contact 63, which may then be released. At the same time, connection from conductor E through normally-closed contacts 55—c, conductor M, normally-closed contacts 56—e, conductor K, normally-closed contacts 58—c, conductor N, contactor C3 and conductor H, energizes the "slow" winding of motor 62, starting the cycle controller operating at its lower velocity.

Within a few seconds after cycle controller 60 is started, pilot valves V1 and V4 are opened by their associated cams. Valve V1 serves to admit control air through the valve 25 to the diaphragm top of valve 18, causing this valve to be opened and the interior of chamber 10 to be placed in communication with the vacuum pipe 20. Valve V4 at the same time causes valve 12 to be closed, sealing off the interior of the chamber from communication with the drain 14. Control air pressure in the conduit 26 serves also to close the contacts of pressure-switch 50.

As the process of evacuation of the chamber now continues, the absolute pressure reaches in succession values corresponding to the settings of the several electrical controllers, controller 43 first opening its contacts, which have been carrying no current. The electrical circuits of controllers 42 and 44 remain inert so long as relay 57 is de-energized, which condition corresponds to the cycle under consideration.

After a lapse of time predetermined by trial, and sufficient to allow the absolute pressure to attain a value near 4 inches of mercury, the contactor C3 is opened by action of its associated cam and the cycle controller brought to rest. As the pressure within the chamber continues to fall, the controller 46, set for an absolute pressure of 4 inches, closes its contacts, and at a pressure of 3 inches the controller 45 closes its contacts, these controllers connecting conductors Z and B, respectively, to line conductors L2, but, owing to contacts C4—b and C5—b being open, not thereby completing any circuit.

As the pressure continues to fall it attains a value of 0.1 inch, corresponding to the point II in Fig. 4, at which time the controller 47 acts to close its contacts, completing a circuit from conductor L2 to conductor P, through the winding of relay 55, conductor O, contact 50—a of pressure-switch 50 and conductor E, which has previously been put in connection with line conductor L1, thus energizing the relay 55, thereby opening contacts 55—c and closing contacts 55—a and 55—b. Contact 55—a serves to bridge the contacts of controller 47, locking the relay 55 in the energized position without respect to subsequent performance of the controller. Contact 55—b completes a circuit from conductor E (which has been shown to be connected to L1) to conductor I, thereby energizing the "fast" winding of motor 62, operating cycle controller 60 at its higher speed, advancing the cams, closing pilot valve V1 and again completing a circuit at contactor C3. The closing of V1 relieves pressure in conduit 26, which allows valve 18 to close, interrupting communication between the chamber 10 and the source of vacuum, and also causes pressure-switch 50 to open its contacts. Contact 50—a upon opening serves to release relay 55, which in turn interrupts the high-speed operation of motor 62. Contacts 50—b and 50—c interrupt circuits already maintained open by contactors C4 and C5, respectively, and therefore not active at this time in the cycle.

The closing of contactor C3 energizes the low-speed winding of motor 62, causing the cycle controller 60 to run at the lower of its two velocities, first opening the pilot valve V3, which applies control air to the diaphragm of valve 15, opening it, and allowing steam to flow freely from the fully-open regulating valve 17 into the interior of chamber 10, causing the pressure therein to rise and approach the predetermined value as set on the controller 43. As the pressure rises, controllers 45, 46, and 47 open their contacts, which have been carrying no current. As the value of 12 inches of mercury is reached, the contacts of controller 43 are closed, joining conductors L2 and Y, thus completing a circuit from L2 through conductor Y, contacts 57—d, conductor U, contacts of pressure-switch 52, conductor R, contactor C4—a to conductor Q, and thence through the winding of relay 56 to conductor E, which, as hereinbefore set forth, is connected to L1.

The energization of relay 56 serves to open contact 56—e in series with contactor C3 and to close contacts 56—a, 56—b, 56—c and 56—d. Contact 56—a serves to bridge the contacts of controller 46, which, however, as the cycle has thus far proceeded, will not complete an electrical circuit. Contact 56—b provides connection between conductors L2 and A, but does not at the moment complete any electrical circuit. Contact 56—c provides from line conductor L—2 to conductor U a path alternative to the above-mentioned circuit including the contacts of controller 43, thus serving to lock the relay 56 in its energized position subject to deenergization only by the subsequent opening of the contacts of pressure switch 52 and not by the opening of the contacts of controller 43. At the same moment as contact 56—e in series with contactor C3 is opened, interrupting the low-speed circuit of motor 62, the high-speed winding is energized by the connecting of conductors E and I through contact 56—d.

The controller now runs at its higher speed until the pilot valve V2 is opened, admitting air to the diaphragm chamber of valve 27, which serves to place the valve 17 under command of the controller 37, whereby the pressure in the chamber 10 is maintained at the predetermined value of 12 inches of mercury (corresponding to the point III in Fig. 4) at which value it is maintained during the first part of the treating process.

Admission of air pressure to the diaphragm of valve 17 serves also through conduit 53 to actuate pressure-switch 52 in a sense to open its contacts, which action de-energizes the winding of relay 56, opening contacts 56—a, 56—b, 56—c and 56—d, and closing contact 56—e. The opening of contacts 56—a and 56—b, which at this time in the cycle are not carrying current, produces no operative effect. The opening of contact 56—c removes the locking circuit of relay 56; and the opening of contacts 56—d and simultaneous closing of contacts 56—e interrupt the high-speed operating circuit of motor 62 and close the slow-speed circuit in series with contactor C3, whereupon the controller proceeds to run at its lower velocity and establish the first period of treatment called for in the cycle.

During this part of the cycle the contactor C4 is operated by its associated cam, opening contact C4—a in series with the already opened contacts of pressure-switch 52, and closing contact C4—b, thus providing an alternative circuit including conductor Q, conductor G, contactor C5—a, conductor S, contacts 50—c and conductor Z, whereby relay 56 may be energized upon the closing of other contacts in series with said circuit.

As the termination of the first treating period, represented by the point IV in Fig. 4, is approached, the pilot valve V3 is closed by its associated cam, thus closing valve 15 and shutting off communication between the regulating valve 17 and the interior of the chamber 10. Immediately thereafter pilot valve V1 is opened and V2 closed. The opening of V1 causes diaphragm valve 18 to open, reestablishing communication between the chamber 10 and the source of vacuum 20, thus initiating a second period of lowering pressure in the processing chamber. At the same time, pressure in conduit 26 serves to close the contacts of pressure-switch 50. The contacts of controller 47 being open, the closing of contact 50—a does not as before energize the relay 55; and contacts C5—b being open, contact 50—c does not complete a circuit. Contact 50—b, however, provides a link in a circuit to be completed by the contacts of controller 46, as hereinafter set forth.

The closing of pilot valve V2 removes pressure from the diaphragm of valve 27, allowing it to close, relieving pressure in the conduit 53, so that the switch 52 closes its contacts. This release of pressure also allows regulating valve 17 to open; but, since valve 15 is closed, no steam is admitted to the processing chamber. During this part of the cycle the contacts of contactor C3 are opened and the motor 62 brought to rest.

As the pressure in the chamber 10 declines, the contacts of controller 43 are opened; and as a pressure of 4 inches of mercury is reached, corresponding to the point V in Fig. 4, the controller 46 closes its contacts, completing a circuit from L2 through conductor Z, contact 50—c, conductor S, contact C5—a, conductor G, contactor C4—b, and the conductor Q and the winding of relay 56 to energize the latter, thus closing contacts 56—a, 56—b, 56—c and 56—d, and opening contact 56—e. Contact 56—a serves to bridge the contacts of controller 46, locking the relay in its energized position. Contact 56—b provides connection between conductors L2 and A, but at this time in the cycle does not complete any circuit. Contact 56—c, also, in closing, does not complete any operative circuit. Contact 56—e, in series with contactor C3, which has already opened the slow-speed circuit of motor 62, produces by its opening no operative effect; but contact 56—d acts, as hereinbefore set forth, to energize the high-speed circuit, so that the cams of controller 60 are advanced at a rapid rate, first closing the pilot valve V1, which acts through the diaphragm valve 18 to shut off the vacuum, and at the same time closing the contacts of contactor C3. The relief of pressure in conduit 26 upon the closing of pilot valve V1 allows pressure-switch 50 to open its contacts, 50—a and 50—b being at this time inactive, and contact 50—c deenergizing relay 56, whose only effect at this time is to open the high-speed circuit of motor 62, as carried by contacts 56—d, and complete the low-speed circuit at contact 56—e in series with contactor C3. The controller 60 now runs at the lower of its two velocities, first opening the pilot valve V3, which in turn causes valve 15 to be opened, allowing steam to flow freely from the valve 17 into the chamber 10, causing the pressure therein to rise and again approach the predetermined setting of controller 43, controller 46 opening its contacts as the pressure rises. During this part of the cycle the contactor C4 is actuated to open the contacts C4—a and close the contacts C4—b.

As the absolute pressure value of 12 inches is again reached, the contacts of controller 43 will close, completing, as hereinbefore set forth, a circuit whereby the relay 56 is energized, transferring the cycle controller 60 from low-speed to high-speed operation. Contact 56—c bridges the contacts of controller 43 and locks the relay 56 in its energized position. This corresponds to point VI in Fig. 4.

The controller 60 now, as before, operates at its higher speed until the pilot valve V2 is opened, causing valve 27 to open and again place valve 17 under regulation of the controller 37, maintaining in the chamber 10 steam at the predetermined treating pressure of 12 inches. The air pressure admitted to the diaphragm of valve 17 acts through conduit 53 to cause pressure-switch 52 to open its contacts, deenergizing relay 56, upon which the controller 60 reverts to its lower speed, establishing the second timed period of treatment required by the cycle.

As the termination of the second treating period, represented by the point VII in Fig. 4, is approached, valve V3 is again closed by its associated cam, shutting off the supply of steam to the treating chamber 10; and a short time thereafter pilot valve V1 is opened, causing valve 18 to open and reestablish communication between the chamber 10 and the source of vacuum 20, and V2 is closed, closing valve 27, relieving air pressure on regulating valve 17, and at the same time closing the contacts of pressure-switch 52. At this time contactor C5 is thrown to a position to open contact C5—a and to close contact C5—b, and at the same time pressure from pilot valve V1 in conduit 26 serves to close the contacts of pressure-switch 50. Because contacts of controller 47 are open, contacts 50—a are inactive. Contacts 50—b provide a link in a circuit subject to completion by the contacts of controller 45. Contacts 50—c, as upon the previous occasion of their closing, provide a link in a circuit subject to completion by the contacts of controller 46. During this part of the cycle the contactor C3 is opened by the associated cam, and the cycle controller 60 brought to rest.

As the pressure in chamber 10 falls, the contacts of controller 43 are opened, and when a pressure of 4 inches is reached, the controller 46 closes its contacts; but, because of the open circuit at contact C5—a, does not energize the relay 56 as on the occasion of the previous decline of pressure. The pressure continues to fall until it reaches a value of 3 inches of mercury, as determined by the setting of the controller 45, corresponding to point VIII in Fig. 4, whereupon the contacts of that controller close, providing a circuit from line conductor L2, to conductor B, through contacts 57—c, conductor A, contacts 50—b of pressure-switch 50, conductor T, contacts C5—b, conductor G, contacts C4—b, conductor Q and the winding of relay 56 to conductor E, energizing said relay as before. Contacts 56—a serve to lock the relay in its energized position. Contacts 56—b provide an alternative locking circuit. Contacts 56—c do not at this time complete an operative circuit. Contact 56—d energizes the high-speed winding of motor 62, causing the cams of the cycle controller 60 to be advanced rapidly, reclosing contactor C3, resetting contactors C4, and C5 to their original positions, and closing the valve V1, thereby interrupting communication of the chamber with the vacuum and incidentally causing the pressure-switch 50 to open its contacts, deenergizing the relay 56, whose only effect at this time is to transfer the operation of the controller 60 from high to low speed. The controller then closes pilot valve V4, which has been held open throughout the treating periods.

The closing of pilot valve V4 removes air pressure from the diaphragm of direct-acting valve 12, allowing it to open and place the interior of chamber 10 in communication with the atmosphere, whereupon the pressure in the chamber 10 rapidly rises to atmospheric, opening the contacts of controllers 45 and 46 and closing those of controller 43, giving a condition as shown at IX in Fig. 4.

As the cycle controller continues to advance at slow speed, the contactor C2 is thrown to a position to open contacts C2—a and close contacts C2—b, thus disconnecting conductor C from line-wire L1 and thereby deenergizing relay 54 and also rendering conductor E unavailable as a source of power for any circuits fed through the contacts of relays 55 and 56, whereby the slow-speed operation of the cycle controller is terminated. At the same instant, however, through contacts C2—b, the conductor I is connected to L1, whereby the cycle controller is at once thrown into operation at high speed, immediately closing contactor C1 and energizing relay 58, which locks in through contacts 58—a and opens contacts 58—b and 58—c, after which C2 reverts to its normal position and the cycle controller continues to advance at high speed without respect to the performance of other relays, controllers, or contactors, until brought to rest in its starting position by the opening of contactor C1 and consequent release of relay 58.

The action of relay 58, whose express purpose is to bring the cycle of operations to a normal termination, may be initiated at any point in the cycle by depressing the momentary contact switch 64, which is directly in parallel with contact C2—b, so that in case of emergency the cycle may be automatically terminated with maximum expediency and all valves and contactors brought to a "safe" position and normal starting conditions established.

Assuming it is desired to process material in chamber 10 according to the cycle involving the group of pressures having the lower values, as shown by the dotted line in Fig. 4, switch 65 is first closed, energizing relay 57 and solenoid valve 40. Relay 57, through contacts 57—b and 57—a substitutes controllers 42 and 44 in the system for controllers 43 and 45, which are disconnected through the action of contacts 57—d and 57—c.

The energization of the three-way solenoid valve 40 serves to place regulating valve 17 under command of controller 36 instead of 37. The controllers 46 and 47 are not in any way affected, so that, upon the initiation of the operating cycle by momentary depression of the push-button switch 63, the treatment of material in chamber 10 will be carried out in a manner exactly similar to that set forth above, but with limiting and regulated pressures in agreement with the settings of the several control instruments introduced in the system due to the closing of switch 65.

When it is desired to transfer the process from chamber 10 to chamber 11, it is only necessary to throw the three-way cock 35 from the position "P—10" to the position "P—11," when operative communication will be established between the control system and chamber 11, as hereinbefore set forth.

We claim:

1. In a control system for a treatment process involving the maintenance of pressure conditions in a selected one of a plurality of treatment chambers at a succession of values and the maintenance of atmospheric conditions in another of said chambers, regulating means for providing a succession of such pressure conditions of predetermined values, other regulating means for providing another succession of such pressure conditions of predetermined values, both said regulating means including a single timing instrument for maintaining such pressure conditions at certain of said predetermined values for predetermined time intervals, means for selectively controlling the pressure conditions in a selected treatment chamber by either of said regulating means and by said single timing means, and means for associating the selected regulating means and said timing means with a selected one of said plurality of treatment chambers and for maintaining atmospheric conditions in the other of said chambers.

2. Means for governing the introduction and withdrawal of a fluid respectively to and from a closed vessel and through valves connected therewith, said means comprising a timing mechanism including cam means, certain of said cam means governing the operation of said valves, an electric motor to drive the cam means, and contactor means driven by other of said cam means; two circuits for operating said motor selectively at a low speed for extended timing of operation of said valves and at a high speed for rapid operation of said valves, one of said circuits including certain of the contactor means for interrupting the circuit to stop the operation of the motor; and means subject to pressure changes in said vessel to complete one of said selective circuits to operate the motor at the higher of said speeds upon the attainment of a certain predetermined pressure value in said vessel, together with other means subject to pressure changes in said vessel and adapted upon the attainment of another predetermined pressure value in said vessel to complete the other of said selective circuits.

3. In a control system for a pair of closed vessels in a selected one of which it is required to produce nonatmospheric conditions while atmospheric conditions are maintained within the other; means for governing the introduction and withdrawal of a fluid respectively to and from said selected vessel and through valves connected therewith, said means comprising a timing mechanism including cam means, certain of said cam means governing the operation of said valves, an electric motor to drive the cam means, and contactor means driven by other of said cam means; two circuits for operating said motor selectively at a low speed for extended timing of operation of said valves and at a high speed for rapid operation of said valves, one of said circuits including certain of the contactor means for interrupting the circuit to stop the operation of the motor; and means subject to pressure changes in said vessel to complete one of said selective circuits to operate the motor at the higher of said speeds upon the attainment of a certain predetermined pressure value in said vessel, together with other means subject to pressure changes in said vessel and adapted upon the attainment of another predetermined pressure value in said vessel to complete the other of said selective circuits; and a single manually actuated control element, together with a three-way valve connected to the respective closed vessels adapted to associate said timing mechanism and the means subject to pressure changes with the selected one of the closed vessels while maintaining atmospheric conditions within the other chamber.

4. In a control system for a process cycle to be alternatively conducted in a selected one of a plurality of closed vessels affording respective treating chambers and requiring that said selected chamber be controllably placed in communication with a vacuum producing means and with a source of fluid flowing at a rate regulated in conformity with a condition within said chamber and the other chamber maintained at atmospheric condition; instrumentalities for effecting regulation of said rate and the communication to the vacuum producing means and including a condition-responsive member selectively communicable with each of said chambers, and a plurality of fluid-pressure-actuated valves adapted when pressure is applied thereto mutually to coact in placing a single one of said chambers in communication with said fluid source or with said vacuum-producing means and with said condition-responsive member, and when pressure is removed therefrom to coact in placing the other of said chambers in communication with said source or with said vacuum-producing means and with said condition-responsive member, together with a manually operated valve for effecting the application or removal of fluid pressure to said valves.

5. In a control system for a process cycle to be alternatively conducted in a selected one of a plurality of closed vessels affording respective treating chambers and requiring that said selected chamber be controllably placed in communication with a vacuum producing means and with a source of fluid flowing at a rate regulated in conformity with a condition within said chamber and the other chamber maintained at atmospheric condition; instrumentalities for effecting regulation of said rate and the communication to the vacuum-producing means and including a condition-responsive member selectively communicable with each of said chambers, and a plurality of fluid-pressure-actuated valves adapted when pressure is applied thereto mutually to coact in placing a single one of said chambers in communication with said fluid source or with said vacuum-producing means and with said condition-responsive member, and when pressure is removed therefrom to coact in placing the other of said chambers in communication with said source or with said vacuum-producing means and with said condition-responsive member, together with a manually operated valve of the supply-and-waste type for effecting the application or removal of fluid pressure to said valves.

6. In a control system for a treatment process to be alternatively conducted for timed intervals in a selected one of a plurality of closed vessels affording treatment chambers, said process including treatment under fluid pressures other than atmospheric; valve means for controlling the introduction and withdrawal respectively of fluids to and from each of said chambers, means for regulating fluid pressure within any selected one of said chambers and including a pressure-sensitive element communicating selectively with said chambers, further pressure-sensitive elements communicating selectively with said chambers, a single timing instrument, means governed jointly by said timing instrument and said last-named pressure-sensitive elements for operating said valve means, together with means for simultaneously associating said regulating means and timing means with one of said chambers and maintaining at atmospheric the condition in another of said chambers.

7. In a control system for a treatment process to be alternatively conducted for timed intervals in a selected one of a plurality of closed vessels affording treatment chambers, said process including treatment under fluid pressures other than atmosperic; valve means for controlling the introduction and withdrawal respectively of fluids to and from each of said chambers, means for regulating fluid pressure within any selected one of said chambers and including a pressure-sensitive element communicating selectively with said chambers, further pressure-sensitive elements communicating selectively with said chambers, a single timing instrument, means governed jointly by said timing instrument and said last-named pressure-sensitive elements for operating said valve means, together with means including a single manually operable element for simultaneously associating said regulating means and timing means with one of said chambers and maintaining at atmospheric the condition in another of said chambers.

WILFRID L. ATWOOD.
LUCIAN N. JONES.
HORACE L. SMITH, Jr.